(No Model.)
G. P. ROCKWELL.
BAKING PAN.
No. 511,801. Patented Jan. 2, 1894.
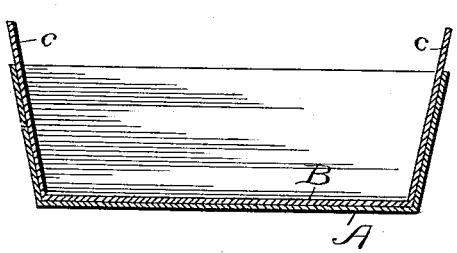
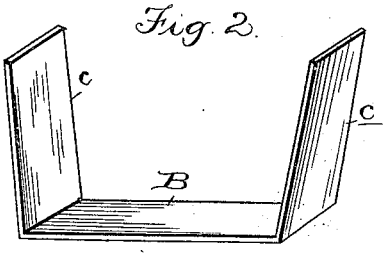
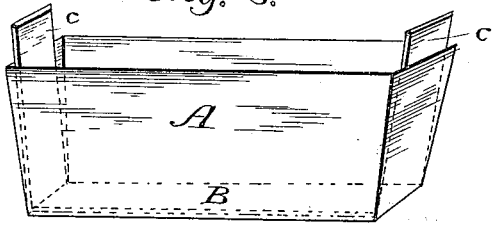
Witnesses
Thos. E. Robertson
W. E. McDaniel
Inventor
Gertrude P. Rockwell
By T. J. W. Robertson
Attorney

UNITED STATES PATENT OFFICE.

GERTRUDE P. ROCKWELL, OF BROOKLYN, NEW YORK.

BAKING-PAN.

SPECIFICATION forming part of Letters Patent No. 511,801, dated January 2, 1894.

Application filed August 3, 1893. Serial No. 482,277. (No model.)

*To all whom it may concern:*

Be it known that I, GERTRUDE P. ROCKWELL, a citizen of the United States, and a resident of the city of Brooklyn, in the county of Kings and State of New York, have invented certain new and useful Improvements in Baking-Pans, of which the following is a specification.

My invention relates to a false or secondary bottom to be used in baking pans for baking cake and other articles of similar nature and is intended to obviate the necessity of greasing the pan, to aid in removing the cake therefrom and to assist in the process of raising by allowing the cake to be inverted and remain in that position without pressure upon its top or upper side.

I am aware that pans have been in use with legs or projections upon the upper side for the purpose of enabling the cake to be inverted without standing upon its top and I do not claim that element singly in my invention nor the false bottom singly, but only in combination.

In the drawings Figure 1 represents a longitudinal vertical section of my invention showing how it is applied to the baking pan. Fig. 2 is a perspective drawing of the secondary or false bottom separate from the pan. Fig. 3 is a perspective drawing of the pan with false bottom in position ready for the reception of the batter or dough.

A is the pan. B is the false bottom of a size to fit the pan but unattached and readily removable therefrom the ends or sides being prolonged into feet or standards, *c. c.* reaching above the sides of the pan and forming supports or legs for the pan with finished cake therein to stand upon when inverted.

The operation of my invention is as follows. The false bottom B is placed in the pan in the position shown in Fig. 3. It is then filled with batter or dough and after the cake has been baked may, if desired be inverted, resting on the legs or projecting ends *c. c.* This will materially assist the raising of the cake. When ready to be removed a knife passed between the cake and pan will separate the cake from the pan and it can then be removed entirely in the false bottom from the pan by raising the false bottom B by the ends *c. c.* which are thus useful as handles, when by passing a knife again between the cake and the false bottom B the cake can be entirely separated and removed therefrom. It is believed that no greasing whatever will be required nor will it be necessary to put any paper or other material in the pan before putting in the batter or dough.

My invention may be applied to round as well as square or rectangular pans. When so applied it will be best to make them with three or more feet or handles of lesser width.

What I claim as my invention, and desire to secure by Letters Patent, is—

1. A false bottom for bake pans having the sides or ends prolonged above the edge of the pan and extending sufficiently far above such edge and being of sufficient width to support the contents in a horizontal position when inverted, substantially as described.

2. As an improved article of manufacture, a false bottom arranged to substantially fill the bottom and two sides of a bake pan and consisting of a piece of sheet metal having its ends bent upwardly and extending above the top edges of the pan, whereby said pan may be supported by the ends of said bottom and its contents held above the surface on which such ends rest, as set forth.

Signed at the city of Brooklyn, in the county of Kings and State of New York, this 1st day of August, A. D. 1893.

GERTRUDE P. ROCKWELL.

Witnesses:
ELZIE KELLEY,
WM. ROCKWELL.